(12) United States Patent  (10) Patent No.: US 8,799,531 B2
Kayama                     (45) Date of Patent:   Aug. 5, 2014

(54) DATA TRANSFERRING APPARATUS AND CONTROL METHOD THEREOF

(75) Inventor: Kazuya Kayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 153 days.

(21) Appl. No.: 13/271,834

(22) Filed: Oct. 12, 2011

(65) Prior Publication Data

US 2012/0124252 A1    May 17, 2012

(30) Foreign Application Priority Data

Nov. 16, 2010  (JP) ................................. 2010-256319

(51) Int. Cl.
  *G06F 13/00*   (2006.01)
  *G06F 15/177*  (2006.01)
  *G06F 13/42*   (2006.01)

(52) U.S. Cl.
  CPC .... *G06F 13/4282* (2013.01); *G06F 2213/0042* (2013.01); *G06F 2213/0026* (2013.01)
  USPC .......................................... 710/32; 709/222

(58) Field of Classification Search
  None
  See application file for complete search history.

(56) References Cited

U.S. PATENT DOCUMENTS

| 6,363,491 B1 | 3/2002 | Endo .............................. 713/310 |
| 6,954,879 B1 | 10/2005 | Tobias et al. |
| 2004/0015732 A1 | 1/2004 | El-Kik et al. |
| 2006/0161727 A1* | 7/2006 | Surico et al. ................... 711/103 |
| 2006/0248174 A1* | 11/2006 | Schultz et al. ................. 709/222 |
| 2009/0222690 A1* | 9/2009 | Seelig et al. .................... 714/15 |

FOREIGN PATENT DOCUMENTS

| GB | 2425861 A | 11/2006 |
| JP | 11-305880 A | 11/1999 |
| JP | 2005-148896 A | 6/2005 |

OTHER PUBLICATIONS

European Patent Office, European Search Report dated Aug. 20, 2012, in connection with European Application No. 11008028.0 (5 pages).

* cited by examiner

*Primary Examiner* — Hyun Nam
(74) *Attorney, Agent, or Firm* — Fitzpatrick, Cella, Harper & Scinto (57) ABSTRACT

A data transferring apparatus, that is capable of connecting to at least one device and that transfers a request from a host to the device, obtains, in response to receiving a suspend request for suspending at least one of the devices from the host, configuration data of the target device (or port) for suspension indicated by the suspend request from the device, and saves the obtained configuration data. During resume, the saved configuration data is set in the device (or the port).

15 Claims, 11 Drawing Sheets

DATA TRANSFERRING APPARATUS AND CONTROL METHOD THEREOF

BACKGROUND OF THE INVENTION

1. Field of the Invention

The present invention relates to data transferring apparatuses that control multiple endpoint devices, and to control methods for such apparatuses.

2. Description of the Related Art

A data transferring system in which a host and multiple endpoint devices are connected via a switch, a hub, or the like, and which carries out the point-to-point transfer of image data, commands, and so on, is known. For example, with PCI-Express, which has in recent years been put into practical application as a high-speed serial transfer technique, a host and an endpoint device are connected point-to-point (that is, are connected one-to-one). Accordingly, a switch that is compliant with PCI-Express is used when connecting multiple endpoint devices to the host in order to carry out point-to-point communication (see Japanese Patent Laid-Open No. 2005-148896).

Generally speaking, the transition has followed the procedure described hereinafter in a data transferring system that is configured of a host, a switch, and endpoints, when transiting the link of an endpoint device to an L2 state (an example of a suspend state as defined by PCI-Express; details will be given later).

1. The host sends a message to the switch for transiting the endpoint device and a corresponding port within the switch to the L2 state.
2. The message sent in 1 is broadcasted by the switch, and is sent to all of the endpoint devices that are under that switch.
3. Each endpoint device that has received the stated message sends, to the switch, a message indicating acceptance of the suspension.
4. Upon receiving a message indicating acceptance of the suspension from all of the endpoint devices, the switch sends a message indicating acceptance of the suspension to the host.
5. The host transits all of the links to the endpoint devices to the L2 state.

On the other hand, when resuming a link from the L2 state (the suspend state) to an L0 state (a normal state), the link is restored from the initial state of the link, in accordance with an LTSSM (Link Training Status State Machine). Note that a "state in which a link is established" refers to a state in which a connection that enables data communication is maintained.

Meanwhile, with USB 3.0, which is currently garnering attention as a high-speed serial transfer technique, a focus on mobile devices has led to a strong demand for a reduction in energy consumption; therefore, the USB controller does not carry out polling, and four link states (U0, U1, U2, and U3) are provided. The U0 state is "link active"; the U1 and U2 states are "link idle"; and the U3 state is "suspended". With USB 3.0, a USB hub is used in order to connect a host to multiple endpoint devices in a point-to-point manner (see Japanese Patent Laid-Open No. 11-305880). With USB 3.0, the host can transit a specific endpoint device connected to the hub from the U0 state to the U3 state through software control. When resuming a link from the U3 state (suspended) to the U0 state (normal), on the other hand, the link between the host and the endpoint device is restored from the initial state of the link in accordance with a power state diagram prepared for USB 3.0.

Generally, when resuming a suspended device, it has been necessary for the host to establish a link after putting the device in its initial state, and thus a heavy load has been placed on the host that carries out the resume process for the device. This applies to both PCI-Express and USB 3.0.

SUMMARY OF THE INVENTION

An aspect of the present invention provides a data transferring apparatus that reduces the load on a host when the host carries out a resume process for a device in a suspend state, and provides a control method for such an apparatus.

According one aspect of the present invention, there is provided a data transferring apparatus that is capable of connecting to at least one device and that transfers a request from a host to the device, the apparatus comprising: a control unit that, in response to receiving a suspend request for suspending at least one of the devices from the host, obtains configuration data of the target device for suspension indicated by the suspend request from the device; and a holding unit that holds the configuration data obtained by the control unit.

According to another aspect of the present invention, there is provided a data transferring apparatus that is capable of connecting to at least one device and that transfers a request from a host to the device, the apparatus comprising: a control unit that, in response to receiving a suspend request for suspending at least one of the devices from the host, obtains configuration data used in data communication from a port to which the target device for suspension indicated by the suspend request is connected; and a holding unit that holds the configuration data obtained by the control unit.

According to another aspect of the present invention, there is provided a data transferring apparatus that is capable of connecting to at least one device and that transfers a request from a host to the device, the apparatus comprising: a receiving unit that receives, from the host, a suspend request specifying one of the devices as a target device for suspension or a resume request specifying one of the devices as a target device for resume; an obtainment unit that, in the case where the suspend request has been received by the receiving unit, obtains configuration data from the target device for suspension specified by the suspend request, and stores the configuration data in a holding unit; and a control unit that, in the case where the suspend request has been received by the receiving unit, transits the target device for suspension to the suspend state after the obtainment unit has stored the configuration data in the holding unit, and that, in the case where the resume request has been received by the receiving unit, resumes the target device for resume from the suspend state by reading the configuration data of the target device for resume stored in the holding unit and setting the configuration data in the target device for resume.

According to another aspect of the present invention, there is provided a control method for a data transferring apparatus that is capable of connecting to at least one device and that transfers a request from a host to the device, the method comprising: obtaining, in response to the reception of a suspend request for suspending at least one of the devices from the host, configuration data of the target device for suspension indicated by the suspend request from that device; and holding the configuration data obtained in the obtaining in a storage device that can be accessed by the data transferring apparatus.

Also, according to another aspect of the present invention, there is provided a control method for a data transferring apparatus that is capable of connecting to at least one device and that transfers a request from a host to the device, the method comprising: obtaining, in response to the reception of a suspend request for suspending at least one of the devices from the host, configuration data used in data communication from a port to which the target device for suspension indicated by the suspend request is connected; and holding the configuration data obtained in the obtaining in a storage device that can be accessed by the data transferring apparatus.

Furthermore, according to another aspect of the present invention, there is provided a control method for a data transferring apparatus that is capable of connecting to at least one device and that transfers a request from a host to the device, the method comprising: receiving, from the host, a suspend request specifying one of the devices as a target device for suspension or a resume request specifying one of the devices as a target device for resume; obtaining, in the case where the suspend request has been received in the receiving, configuration data from the target device for suspension specified by the suspend request, and storing the configuration data in a holding unit; and in the case where the suspend request has been received in the receiving, transiting the target device for suspension to the suspend state after the configuration data has been stored in the holding unit in the obtaining, and, in the case where the resume request has been received in the receiving, resuming the target device for resume from the suspend state by reading the configuration data of the target device for resume stored in the holding unit and setting the configuration data in the target device for resume.

Further features of the present invention will become apparent from the following description of exemplary embodiments (with reference to the attached drawings).

DESCRIPTION OF THE EMBODIMENTS

First Embodiment

Figure 1:
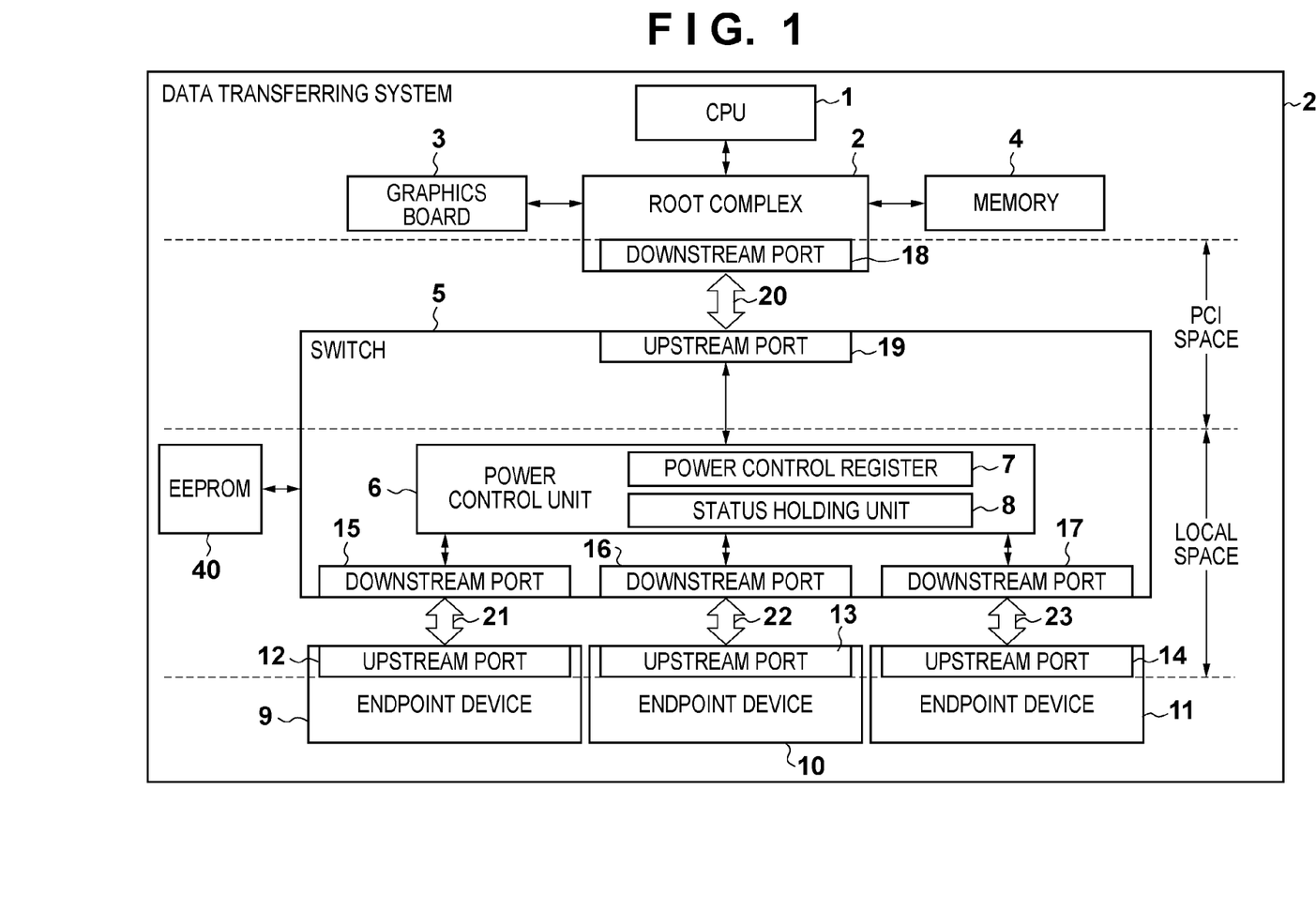
FIG. 1 is a diagram illustrating a data transferring system according to a first embodiment.

FIG. 1 is a block diagram illustrating a data transferring system 24 according to a first embodiment. A central processing unit 1 (called a "CPU 1" hereinafter; this may instead be an MPU), which serves as a host, carries out the overall control of a system that includes multiple devices. A root complex 2 is located in the uppermost position in an IO layer, and connects the CPU 1, a graphics board 3, a memory 4, sub-systems (not shown), and so on to the IO. The root complex 2 includes a downstream port 18, and the root complex 2 and a switch 5 are connected to each other via the downstream port 18 and an upstream port 19. The switch 5 is provided as a switching unit for connecting the host one-to-one to multiple devices. The switch 5 is capable of connecting multiple endpoint devices (devices) and the host (via the root complex), and is used to extend the PCI-Express (denoted as "PCIe" hereinafter) ports. Note that in the case where the endpoint devices are all internal devices, the data transferring system 24 may be implemented upon a single board. However, in the case where a printer, an image processing apparatus, or the like connected via PCIe are to be handled as endpoint devices, the data transferring system 24 is realized through multiple devices.

The switch 5 according to the present embodiment includes a power control unit 6, and the power control unit 6 reduces the load on the CPU 1 when carrying out a resume process for multiple endpoint devices 9, 10, and 11 connected to the switch 5. Furthermore, the control carried out by the power control unit 6 is simple, and thus the scale of the circuit can be reduced, which in turn reduces the power consumed by the power control unit 6. Specific operations carried out by the power control unit 6 will be described later. A power control register 7 is a register that is set by the CPU 1; a suspend instruction (a suspend request) and a resume instruction (a resume request) for the endpoint devices are written into this power control register 7.

A status holding unit 8 includes a register or a memory, and is used to store the following:

configuration data (communication parameters) for downstream ports 15, 16, and 17 of the switch 5;

configuration data (operation parameters) for the endpoint devices;

an address conversion table used by the switch 5 to convert requests issued by the host to devices in a first address space, into a second address space; and so on. It is sufficient for the status holding unit 8 to have a size of approximately 4 KByte.

Printers, cameras, and so on can be given as examples of the endpoint devices 9, 10, and 11. The configuration data (communication parameters, operation parameters, and so on, mentioned later), the stated address conversion table, and so on saved by the power control unit 6 are stored in an EEPROM 40 (or the status holding unit 8, if the unit has an uninterruptible power source) immediately after a reset. Note that in the present embodiment, the address conversion table handles the first address space as a PCI address space, and handles the second address space as a local address space. In other words, the address conversion table is mapping information for mapping data (issued requests) written in the PCI address space to the local address space (a device address space). The endpoint devices 9, 10, and 11 include upstream ports 12, 13, and 14, respectively, for communicating with the respective downstream ports 15, 16, and 17 of the switch 5. Communication paths 21, 22, and 23 for connecting the downstream ports 15, 16, and 17 to the upstream ports 12, 13, and 14, respectively, are PCIe connections based on PCI-Express.

Figure 2:
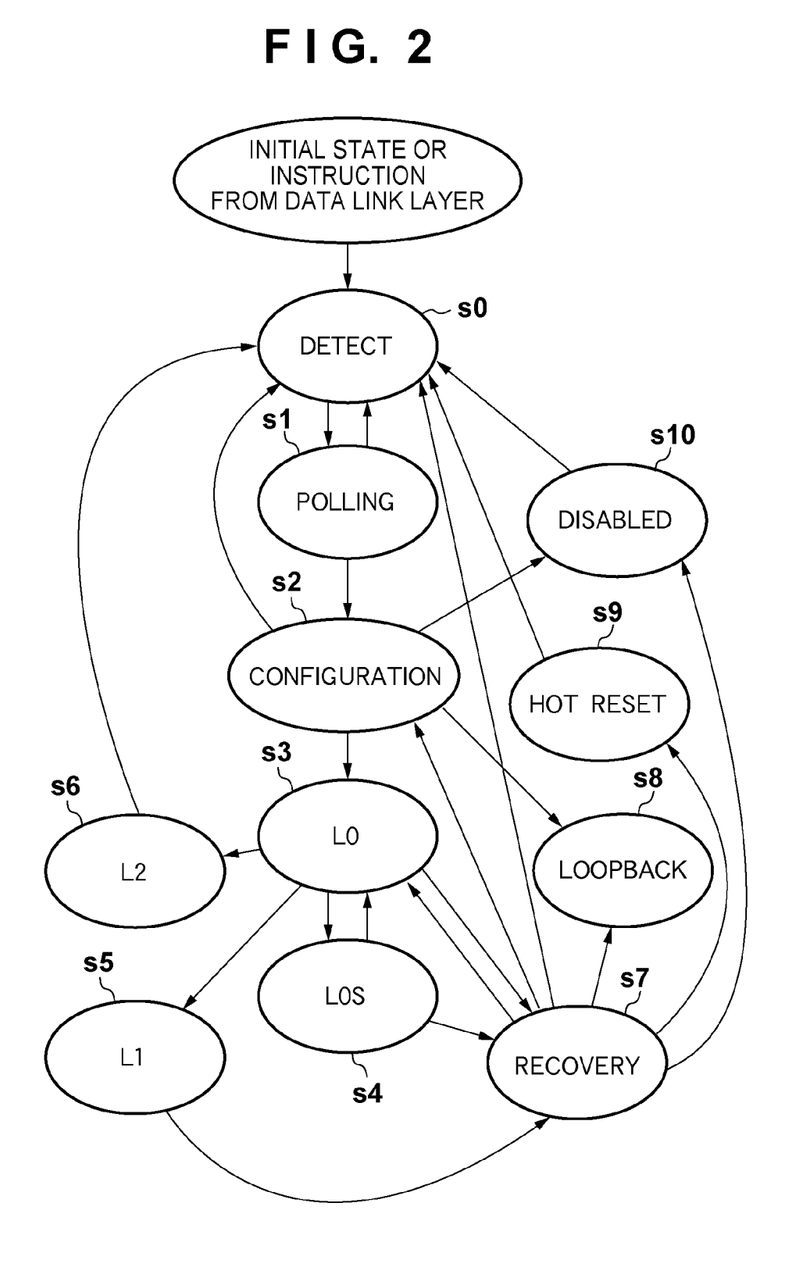
FIG. 2 is a state transition diagram that follows an LTSSM.

FIG. 2 is a state diagram for the LTSSM (Link Training Status State Machines) of the PCI-Express connections 21 through 23, respectively (referred to as "PCIe connections" hereinafter), according to the present embodiment (and more specifically, is a state diagram indicating the ports related to the connections). With PCI-Express, L0, L0s, L1, and L2 link power states are provided, and based on the link state, a device transits to a power-saving state automatically without the involvement of software. For example, L0 indicates a full-on communication state, but in the case where there are no packets that are to be sent over that link, the device transits to the L0s, L1, or L2 state automatically. Note that the state shown in FIG. 2 indicates content that is defined by PCI-Express (although some states are not shown in the drawing). Furthermore, in the present embodiment, the PCIe connections 21 through 23 can each take on a different state. The various states shown in FIG. 2 will be described hereinafter.

After a reset, a link starts from s0. In the DETECT state in s0, a remote-side receiver is detected, and the state transits to the next state s1 after the detection. In the POLLING state in s1, bit synchronization and symbol synchronization are established, the lane polarity is detected, and the data rate is set. The state then transits to s2. In the CONFIGURATION state in s2, a training sequence is sent/received, the lane configuration of the link is established, and lane-to-lane deskew and scramble settings are carried out. Once the CONFIGURATION state has ended normally, the state transits to s3. The L0 state in s3 is the normal state, and when this state is reached, the initialization of the physical layer ends.

Hereinafter, power-saving states defined in the PCIe standard will be briefly described. The states s4 (L0S), s5 (L1), and s6 (L2) transited to from s3 (the normal state) are low-power-consumption states, in which data communication is not carried out. Specifically, in the L0s state in s4, the link is in an electrically idle state, but unlike s3, the clock supply to the port is stopped. In s4, the power consumption is suppressed to be approximately 30 to 40% of s3, and thus it requires approximately 100 ns to several as to be restored to s3. In the L1 state in s5, the link is in an electrically idle state, but the clock supply to the port involved in the PCIe connection is stopped. In s5, the power consumption is suppressed to be approximately 10 to 20% of s3, and thus it requires approximately several ms to 10 ms to be restored to s3. In the L2 state in s6, transmitter and receiver functions, as well as the clock supply, are stopped, the main power is cut off, and only backup power is supplied. For this reason, although an extremely low amount of power is consumed compared to S3, it is necessary to establish a link from the initial state (S0) when restoring from s6 to s3, and thus the restoration takes a long time.

In addition, in the RECOVERY state in s7, the link is restored from the states s3 through s5. In the s7 state, a training sequence is executed using the link speed, link number, lane number, and so on of the already-established link, and bit synchronization, symbol synchronization, lane-to-lane deskew, and so on are executed. In the LOOPBACK state in s8, testing, detection of problems, and so on are carried out. The state transits to the HOT RESET state in s9 in the case where a HOT RESET has been instructed from an upper layer, in the case where a HOT RESET has been instructed during link control in a training sequence, and so on. The state transits to the DISABLED state in s10 in the case where, when the link has been set to be unusable, and instruction to stop has been made from an upper layer, the link is set to be unusable in a training sequence, and so on.

Next, specific configuration and operations according to the first embodiment will be described. As shown in FIG. 1, the switch 5 according to the present embodiment includes the one upstream port 19 and the three downstream ports 15, 16, and 17, and the CPU 1 is connected to the endpoint devices 9, 10, and 11. In order to enable the CPU 1 to directly control the endpoint devices, a switch is typically used as a PCI-PCI bridge by setting the header type of the upstream port of the switch to "1".

Unlike such a switch that is used as a PCI-PCI bridge, the switch 5 according to the present embodiment has the header type of the upstream port 19 set to "0", and thus the CPU 1 treats the switch 5 as an endpoint device and controls the system as a whole. Furthermore, the power control unit 6 is provided in the switch 5, and the power control unit 6 is caused to carry out link control and data transfer with the endpoint devices 9, 10, 11, and to control the power sources of the endpoint devices 9, 10, and 11.

By using the switch 5 as described here, the PCI address space is formed between the CPU 1 and the switch 5, the local address space is formed between the switch 5 and the endpoint devices 9, 10, and 11, and thus the address spaces can be handled in an independent manner. Although strictly speaking, the space between the CPU 1 and the root complex 2 is a CPU address space and the space between the root complex 2 (the downstream port 18) and the switch 5 is a PCI address space, the CPU address space will not be discussed in the present embodiment. The power control unit 6 of the switch 5 maps the data written by the CPU 1 into addresses in the PCI space (PCI-based addresses) to the local space using an address table held in the EEPROM 40. In this manner, by using the power control unit 6 of the switch 5, it is possible to realize the transfer of data between the CPU 1 and the endpoint devices 9 through 11, which cannot be directly accessed by the CPU 1, without the CPU 1 and the endpoint devices 9 through 11 taking into consideration differences in their address spaces. Although in the stated embodiment, the PCI address space is given as an example of a predetermined bus address space formed between a host device (the CPU 1 or the like) and the switch 5, it should be noted that the present embodiment can also be applied when using another address space.

Hereinafter, operations of the power control unit 6 according to the present embodiment will be described, using the endpoint device 9 as a target for suspend or resume. First, operations performed by the power control unit 6 when a command for transiting the endpoint device 9 from the normal state to the suspend state has come from the system (for example, the CPU 1) will be described using the flowchart in FIG. 3. Note that in the data transferring system according to the present embodiment, operations between the CPU 1 and the switch 5 and between the switch 5 and the endpoint devices 9 through 11 are carried out in accordance with the PCIe standard.

Register data for suspending the endpoint device 9 that is the target for suspension (that is, a suspend instruction indicating the endpoint device 9 as the target for suspension) is written by the CPU 1 into a memory space in the PCI address space of the switch 5, via the communication path 20. This register data is mapped from the memory space in the PCI address space to a memory space in the local address space by the power control unit 6, and is stored in the power control register 7 in the local space. In this manner, the switch 5 transfers the request from the CPU 1 to the device.

The communication parameters of the downstream ports 15, 16, and 17, the operation parameters of the endpoint devices 9, 10, and 11, and so on are stored in the EEPROM 40. The power control unit 6 can transfer data between the PCI address space and the local address space by setting communication parameters in the downstream ports 15, 16, and 17. Through this, data can be transferred between the CPU 1 and the endpoint devices 9, 10, and 11. Note that the loading of data by the power control unit 6 from the EEPROM 40 to the ports used in the PCIe connections 21 through 23 and to the endpoint devices is carried out immediately after a reset; the details of this will be given later.

Figure 3:
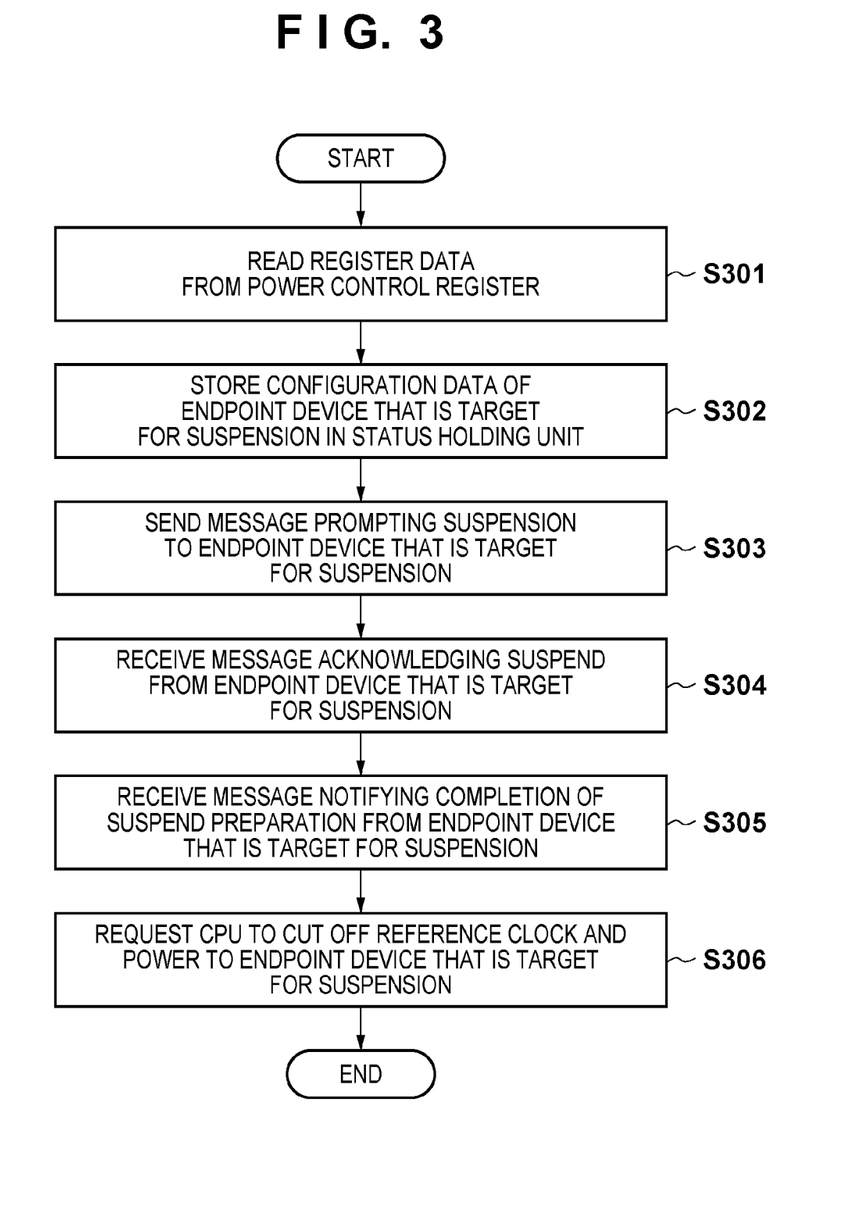
FIG. 3 is a flowchart illustrating operations of a power control unit when a link is suspended according to the first embodiment.

Upon reading the register data instructing the endpoint device 9 to be put into suspend from the power control register 7 (the suspend instruction indicating the endpoint device 9 as the target for suspension) (step S301), the power control unit 6 commences operations for suspending the endpoint device 9. First, the power control unit 6 reads and obtains the operation parameters of the endpoint device 9, and stores those parameters in the status holding unit 8 (step S302). These operation parameters refer to values that specify the various operations of the endpoint device 9, and are stored in a control register or the like within the endpoint device 9. The details of the operation parameters differ depending on the type of endpoint device 9. For example, in the case of a printer, device-unique information such as whether or not a dual-sided printing unit is provided, the printing speed (ppm), and so on, information indicating the operational mode of the printer when transiting to the suspend state (2-in-1 printing, password-locked, or the like by default), or the like is held as the operation parameters.

Meanwhile, in the case where the device is to be transited to the L2 state, in which a link is connected, in step S302, the power control unit 6 also stores communication parameters indicating the configuration of the PCIe connection 21 in the status holding unit 8. Information indicating settings determined in S0 to S2 in FIG. 2 when establishing the PCIe connection 21 (lane-to-lane skew, lane configuration, and so on) is included in the communication parameters. Here, because the settings of the PCIe connection 21 are the same between the downstream port 15 and the upstream port 12, the power control unit 6 may obtain the communication parameters from the downstream port 15. Note that the operation parameters of the endpoint device 9 may be obtained any time before the endpoint device 9 is suspended. Likewise, the communication parameters of the downstream port 15 may be obtained any time before the PCIe connection 21 is cut off. After the various parameters have been saved, a message prompting the device to be suspended (PME_Turn_Off: TLP) is sent to the endpoint device 9 via the communication path 21 (step S303). After sending the message (PME_Turn_Off) prompting suspension to the endpoint device 9, the power control unit 6 receives, from the endpoint device 9, a message (PME_TO_Ack: TLP) accepting the suspension (step S304).

Next, the power control unit 6 receives, from the endpoint device 9, a message (PM_Enter_L23) indicating that preparations to enter suspension have been completed (step S305). When the message (PM_Enter_L23) indicating that the preparations to enter suspension have been completed has been received, the power control unit 6 sends, to the CPU 1, a signal requesting the supply of a reference clock and the power to the endpoint device 9 to be cut off (step S306). It should be noted that an interrupt signal is preferable for this type of request signal. The interrupt signal generated by the power control unit 6 is transferred from the local address space, through the PCI address space, and to the CPU 1. Upon receiving the stated interrupt signal, the CPU 1 stops the supply of the reference clock and the power to the endpoint device 9. Through this, the link of the endpoint device 9 is transited to the L2 state.

Figure 4:
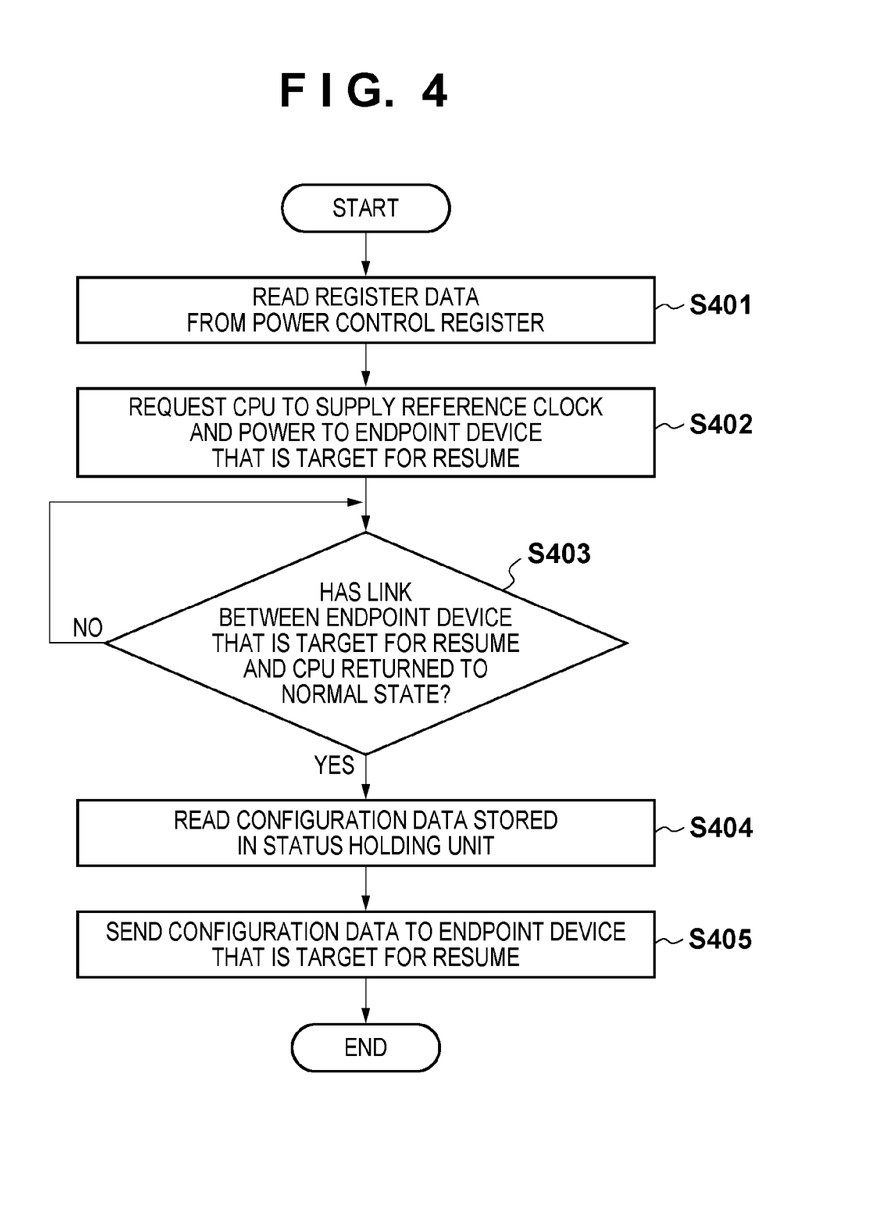
FIG. 4 is a flowchart illustrating operations of a power control unit when resuming a link according to the first embodiment.

Next, using FIG. 4, operations carried out when the system resumes the endpoint device 9 from the suspend state to the normal state will be described. First, the CPU 1 writes, into a predetermined memory in the PCI address space of the switch 5, register data for resuming the endpoint device 9 (a resume instruction specifying the endpoint device 9 as the target for resume). The power control unit 6 converts the written register data from the PCI address space to the local address space, and stores the converted data in the power control register 7. Upon reading the register data (instructing the resume of the endpoint device 9) stored in the power control register 7 (step S401), the power control unit 6 commences the resume process for the endpoint device 9.

First, the power control unit 6 issues a request to the CPU 1 to start the supply of the reference clock and the power to the endpoint device 9, which is the target for resume (step S402). It is preferable to use, for example, an interrupt signal for this request. When the supply of the reference clock and the power to the endpoint device 9, which is the target for resume, is started, the power control unit 6 carries out the resume process for the link between the CPU 1 and endpoint device 9, and waits for the link to be restored to the normal state (L0) (step S403). As the resume process for the link, the link used in PCIe data transfer can be resumed by the power control unit 6 setting the communication parameters in the downstream port 15 and upstream port 12. Note that the processes indicated in S0 to S2 of FIG. 2 may be carried out as the link resume process. When the link has been restored to the normal state (L0), the power control unit 6 reads the operation parameters of the endpoint device 9 that are stored in the status holding unit 8 (or the EEPROM 40) (step S404). Then, the power control unit 6 sends the operation parameters read in step S404 to the endpoint device 9 (step S405). By setting the configuration data (the operation parameters and communication parameters) in the endpoint device 9, the settings of the endpoint device 9 can be restored to the same state those settings were in before the device was suspended; thus the endpoint device 9 is resumed from the L2 suspend state.

Thus far, operations performed by the power control unit 6 when suspending and resuming the endpoint device 9 have been described. In the present embodiment, the settings of the endpoint device 9, which have thus far been carried out by the CPU 1, have been described as being carried out by the power control unit 6, which is close to the endpoint device 9, instead. Accordingly, the resume can be carried out at higher speeds than before, which also reduces the burden placed on the CPU 1 by the resume process. Furthermore, according to the present embodiment, using the power control unit 6 and the power control register 7 makes it possible to individually transit the endpoint devices to the L2 state (suspended) while handling the devices, the root complex, and so on in accordance with the PCI-Express standard. As a result, a more effective data transferring system, in terms of both power consumption and processing efficiency, can be realized across the system as a whole.

Although the present embodiment describes the endpoint device 9 as the device that is to be suspended and resumed, it goes without saying that the power control unit 6 can carry out the same control, and that the same effects can be achieved, when the target is the endpoint device 10 or 11. Furthermore, the resume process for the PCIe connection 20 link may be simplified by the power control unit 6 saving the communication parameters of the PCIe connection 20 in the status holding unit 8 (or the EEPROM 40). Furthermore, in the case where the PCIe connection 20 is to be resumed from a power-saving state, a process for re-creating the address conversion table can be eliminated by the power control unit 6 loading, into the switch 5, the address conversion table saved in the status holding unit 8 (or the EEPROM 40). In addition, the status holding unit 8 of the power control unit 6 in the switch 5 may be configured by the EEPROM 40, or, if power from a backup power source is supplied in a stable manner to the power control unit 6, the EEPROM 40 need not be provided. In other words, the configuration data may be saved in a predetermined storage device that is accessible by the power control unit 6 and that is not volatile.

Second Embodiment

Figure 5:
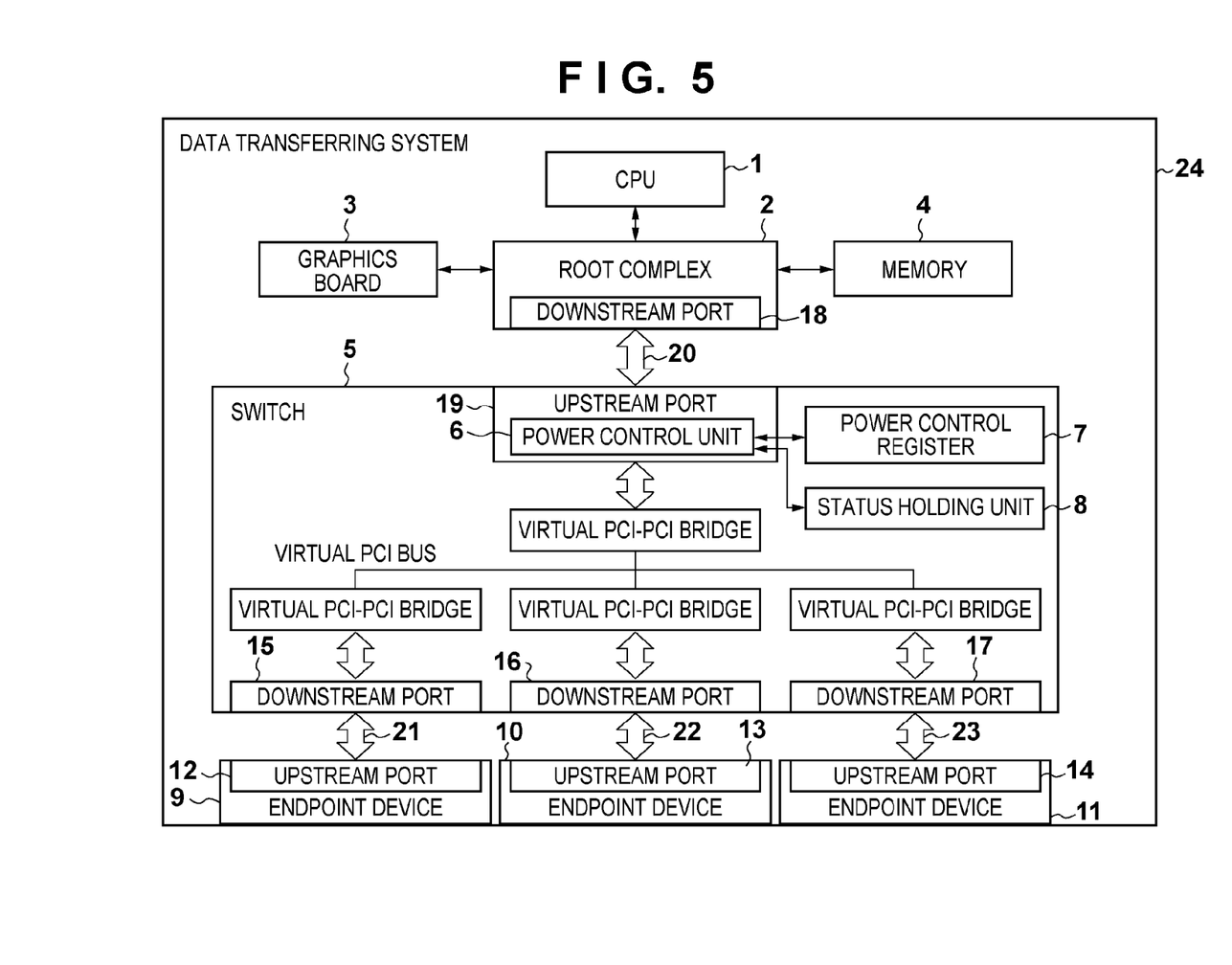
FIG. 5 is a diagram illustrating a data transferring system according to a second embodiment.

FIG. 5 is a block diagram illustrating a data transferring system according to a second embodiment. In FIG. 5, blocks that have the same functions as those in FIG. 1 are given the same reference numerals. Furthermore, descriptions will be omitted for blocks that carry out the same operations as those described in the first embodiment.

First, the differences between the second embodiment and the first embodiment will be described. In the second embodiment, the switch 5 forms a virtual bus bridge, and operates so as to be treated as a bus bridge by a host device. As shown in FIG. 5, the upstream port 19 of the switch 5 connects to the downstream ports 15 through 17 via a virtual PCI-PCI bridge. In the second embodiment, the header type of the upstream port 19 of the switch 5 is set to "1", and the switch 5 is used as a bus bridge (a PCI-PCI bridge). By using such settings, the CPU 1 communicates with the endpoint devices 9, 10, and 11 without traversing address spaces from the PCI address space to the local address space as in the first embodiment. For this reason, the CPU 1 can carry out the configuration settings for the downstream port of the switch 5 and the endpoint devices. Accordingly, the EEPROM 40, which is necessary in the first embodiment, can be omitted from the present embodiment. In addition, with the switch 5 according to the first embodiment, a circuit for mapping the PCI address space to the local address space is necessary within the switch 5, but such is not necessary with the switch 5 according to the second embodiment. As described above, the configuration of the second embodiment is more advantageous than the data transferring system according to the first embodiment in terms of reduced power consumption and reduced costs.

Next, the configuration and operations of the second embodiment will be described in detail. As in the first embodiment, the switch 5 according to the second embodiment includes the power control unit 6, the power control register 7, and the status holding unit 8. However, as mentioned above, the circuit that corresponds to the power control unit 6 has a simpler configuration than in the first embodiment. Hereinafter, operations performed by the power control unit 6 according to the second embodiment will be described using the endpoint device 9 as an example of a target for suspension and a target for resume. First, operations performed by the power control unit 6 when a command for transiting the endpoint device 9 from the normal state to the suspend state has come from the system will be described.

Figure 6:
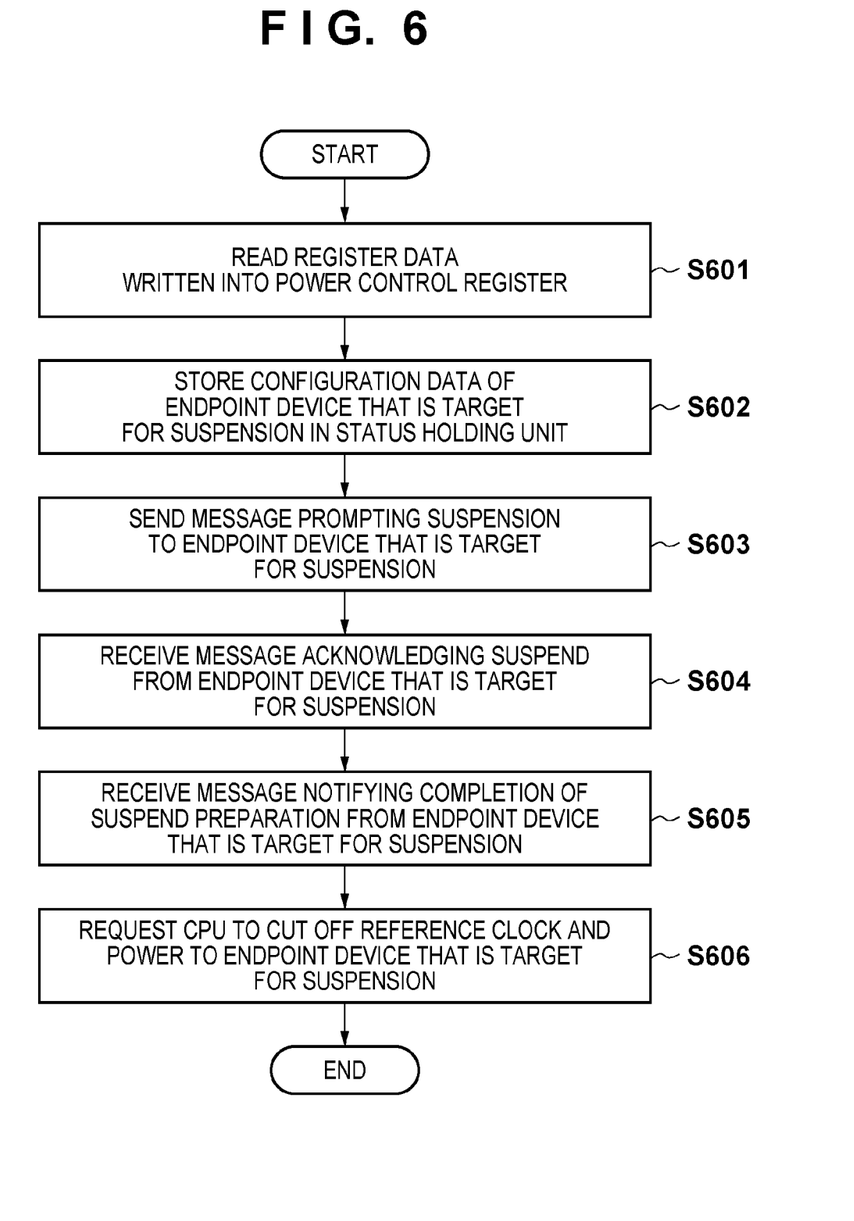
FIG. 6 is a flowchart illustrating operations of a power control unit when a link is suspended according to the second embodiment.

FIG. 6 illustrates a flow of operations performed by the power control unit 6 when transiting the endpoint device 9, which is the target for suspension, from the normal state to the suspend state. Hereinafter, the operations will be described in detail using FIGS. 5 and 6. First, data instructing the endpoint device 9 to be suspended are written by the CPU 1 into the power control register 7 of the switch 5. The power control unit 6 reads the power control register 7 (step S601), and when there is a suspend instruction specifying the endpoint device 9 as the target for suspension, the suspension process from step S602 is commenced. First, the power control unit 6 reads and obtains the operation parameters of the endpoint device 9, and stores those parameters in the status holding unit 8 (step S602). The communication parameters are the same as those in the first embodiment and thus descriptions thereof will be omitted here. The power control unit 6 then sends, to the endpoint device 9 that is the target for suspension, a message (PME_Turn_Off: TLP) prompting the suspension, from the downstream port 15 and through the communication path 21 (step S603).

After this, when a message (PME_TO_Ack: TLP) accepting the suspension is sent from the endpoint device to the downstream port 15, the power control unit 6 receives that message (step S604). Furthermore, when the endpoint device 9 has completed preparations to enter suspension, a message (PM_Enter_L23:DLLP) communicating that the preparations to enter suspension have been completed is sent from the endpoint device 9 to the downstream port 15. The power control unit 6 then receives the message (PM_Enter_L23:DLLP) indicating the completion of preparations for suspension from the endpoint device 9 (step S605). Thereafter, the power control unit 6 sends, to the CPU 1, a signal (for example, an interrupt signal) requesting the supply of a reference clock and the power to the endpoint device 9 to be cut off (step S606). Having received the interrupt signal, the CPU 1 stops the supply of power and the reference clock to the endpoint device 9. As a result, the link state between the endpoint device 9, to which the supply of power and the reference clock has been cut off, and the switch 5, is transited to the L2 state (suspend).

Figure 7:
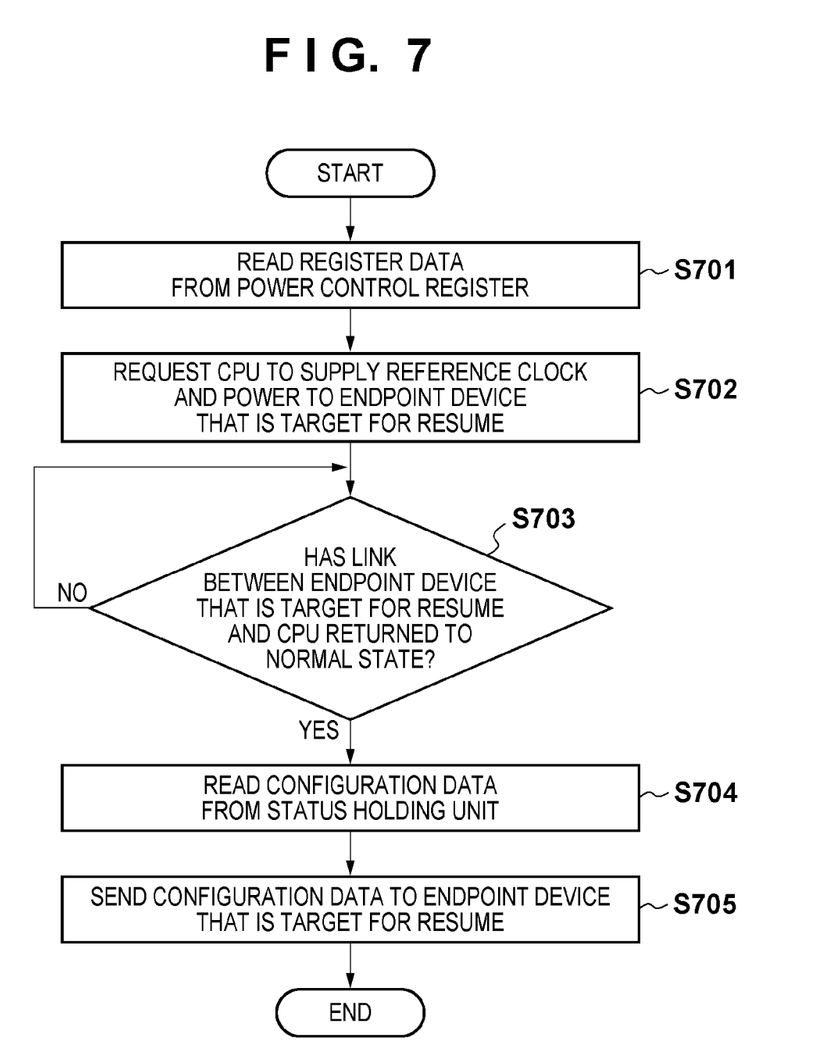
FIG. 7 is a flowchart illustrating operations of a power control unit when resuming a link according to the second embodiment.

Next, operations performed by the power control unit 6 when resuming the endpoint device 9, which is in the suspend state and is the target for resume, from the suspend state to the normal state, will be described. FIG. 7 illustrates a flow of operations performed by the power control unit 6 when resuming an endpoint device that is in the suspend state.

First, register data instructing the endpoint device 9 to be resumed is written by the CPU 1 into the power control register 7 of the switch 5. Then, the power control unit 6 reads the register data from the power control register 7 (step S701), and when a resume instruction specifying the endpoint device 9 as the target for resume has been made, the resume process for the link with the endpoint device 9, which is the target for resume, is commenced. First, the power control unit 6 makes a request to the CPU 1 to start the supply of the reference clock and the power to the endpoint device 9, which is the target for resume (step S702). It is preferable to use, for example, an interrupt signal for this request. When the supply of the reference clock and the power has been started, a link is established between the CPU 1 and the endpoint device 9 from the initial state, according to the LTSSM shown in FIG. 2 (the link resume process may be simplified in the same manner as in the first embodiment using the communication parameters). The power control unit 6 waits for the link between the CPU 1 and the endpoint device 9 to be restored to the normal state (step S703). When the link between the CPU 1 and the endpoint device 9 has been restored to the normal state, the power control unit 6 reads the configuration data of the endpoint device 9 from the status holding unit 8 (step S704). Then, the power control unit 6 sends the read configuration data of the endpoint device 9 to the endpoint device 9 (step S705). By the switch 5 setting the configuration data (the operation parameters and communication parameters) in the endpoint device 9, the settings of the endpoint device 9 can be returned to the same state those settings were in before the device was suspended; thus the endpoint device 9 resumes communication.

Thus far, the second embodiment has described operations performed by the power control unit 6 when suspending and restoring the resuming device 9, in a configuration in which the switch 5 is used as a PCI-PCI bridge. Although the second embodiment also describes the endpoint device 9 as the device that is to be suspended and resumed, it should be noted that the power control unit 6 can carry out the same control when the target is the endpoint device 10 or 11, and that the same effects can be achieved.

Third Embodiment

Figure 8:
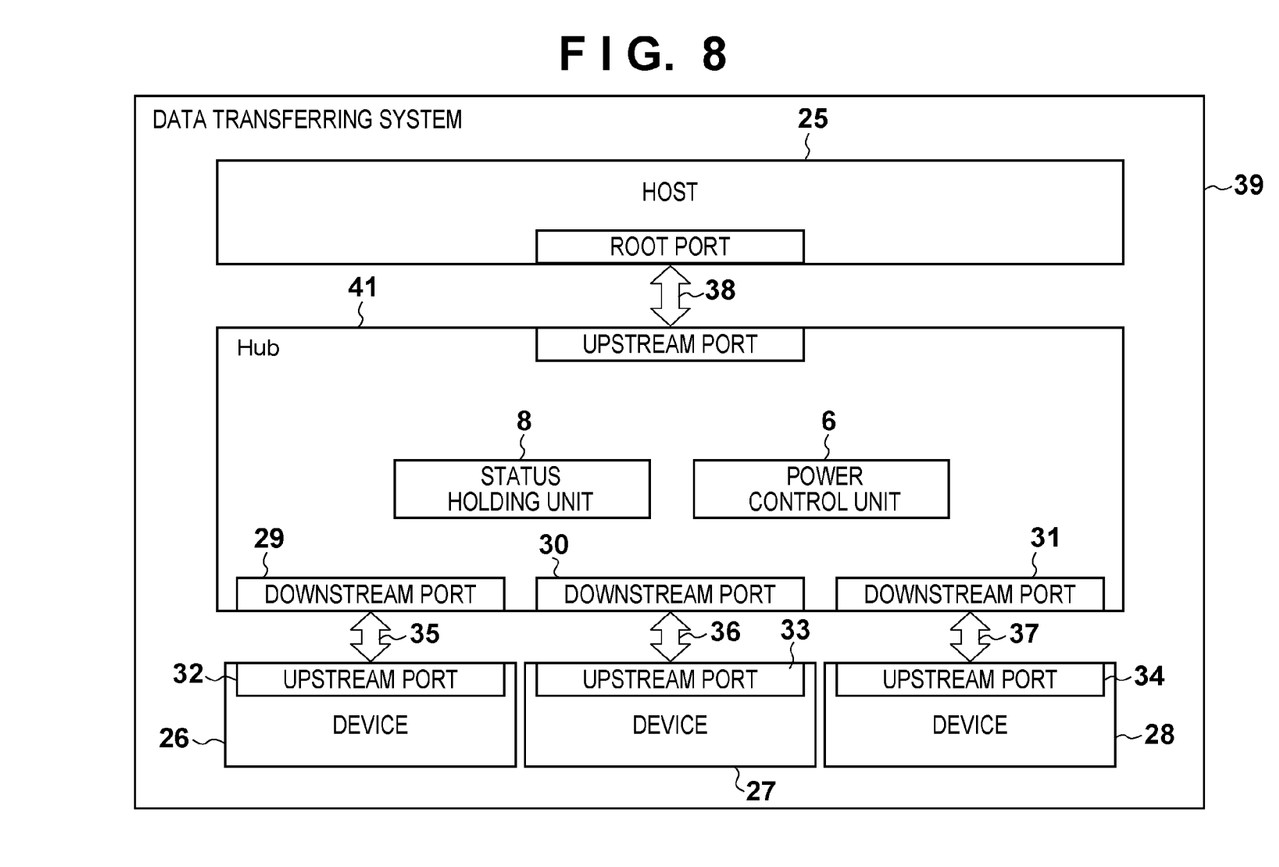
FIG. 8 is a diagram illustrating a data transferring system according to a third embodiment.

FIG. 8 is a block diagram illustrating a data transferring system according to a third embodiment. A host 25 provides processing capabilities, services, and so on to devices 26, 27, and 28 (these correspond to endpoint devices) that are present within a data transferring system 39 according to the third embodiment. The devices 26, 27, and 28 are devices, computers, or the like to which the processing capabilities, services, and so on are provided by the host 25. A hub 41 serves to extend ports, and connects the host 25 to the devices 26, 27, and 28. The hub 41 according to the third embodiment includes the power control unit 6, which further carries out a process for resuming power to the devices 26, 27, and 28, and the status holding unit 8. The numbers 35, 36, 37, and 38 shown in FIG. 8 indicate communication paths based on the USB 3.0 standard.

Figure 9:
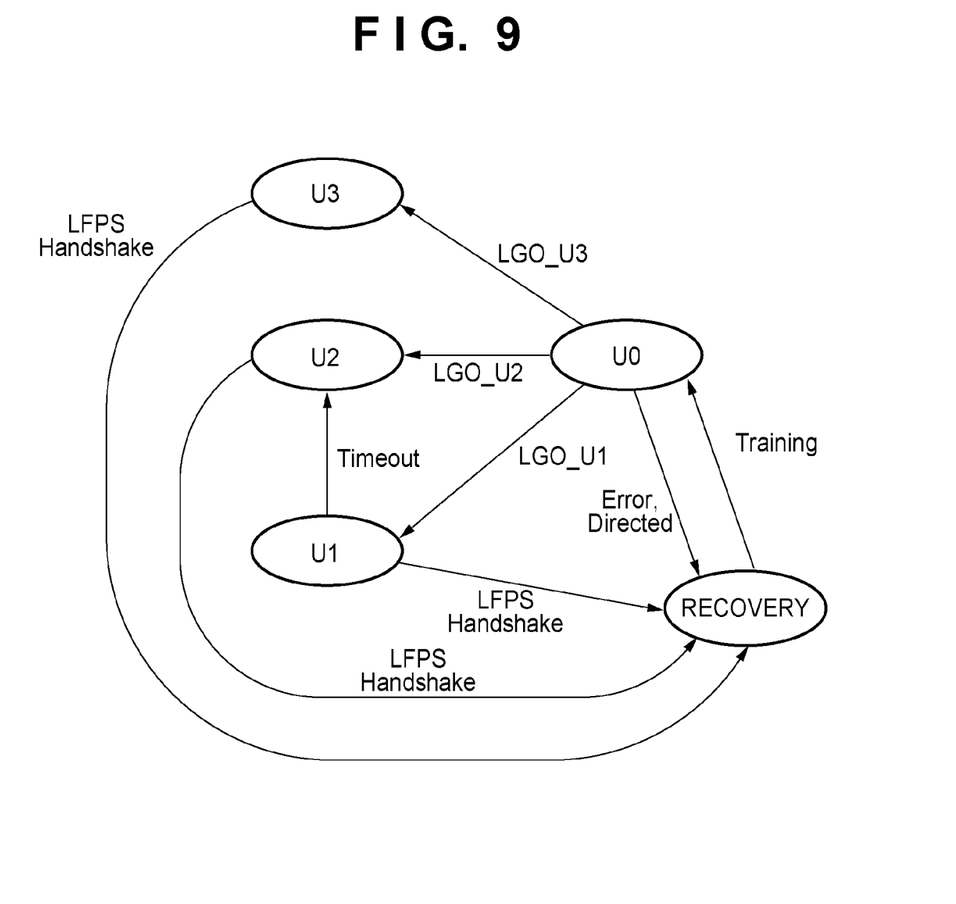
FIG. 9 is a link state transition diagram for USB 3.0.

FIG. 9 is a state diagram illustrating link transitions occurring during USB 3.0 power management. In USB 3.0, link power states U0, U1, U2, and U3 are provided. Each of these power states will be described briefly hereinafter. The U0 state is a state in which a link is active. The U1 state is a state in which a link is idle and transmission and reception circuits are stopped. Restoration from the U1 state to the U0 state takes an amount of time on the order of µs. The U2 state is a state in which a clock generator such as a PLL is stopped, on top of the link idle state in the U1 state. Restoration from the U2 state to the U0 state takes an amount of time on the order of µs to several ms. The U3 state is a suspend state, in which some of the power to the device is turned off. Resume from the U3 state to the U0 state takes an amount of time on the order of ms.

Next, specific configurations and operations according to the third embodiment will be described. The hub 41 according to the third embodiment includes a single upstream port that is connected to the host 25 and three downstream ports 29, 30, and 31 that are connected to the devices 26, 27, and 28, and thus connects the host 25 to the three devices 26, 27, and 28. The host 25 and the hub 41 are connected by a communication path 38 provided between the root port of the host 25 and the upstream port of the hub 41. Meanwhile, upstream ports 32, 33, and 34 of the devices 26, 27, and 28 are connected to the downstream ports 29, 30, and 31 of the hub 41 by the communication paths 35, 36, and 37, respectively. Furthermore, the power control unit 6 and the status holding unit 8 are provided in the hub 41, and the power control unit 6 is caused to carry out configuration settings when restoring the power of the devices 26, 27, and 28.

Hereinafter, operations of the hub 41 according to the third embodiment will be described, using the device 26 as the target for suspension and resume. First, operations performed by the hub 41 when a command to transit the device 26, which is the target for suspension, from the normal state (U0) to the suspend state (U3) has been received from the system, will be described with reference to the flowchart shown in FIG. 10. Suspension from the U0 state or U3 state is controlled by system software, and is carried out by the host 25 setting a PORT_LINK_STATE in the root port. When PORT_LINK_STATE is set in the root port, the processes described hereinafter are executed by the hub 41. Note that it is assumed that the power control unit 6 is provided with a function to monitor the details of commands received from the host device.

Figure 10:
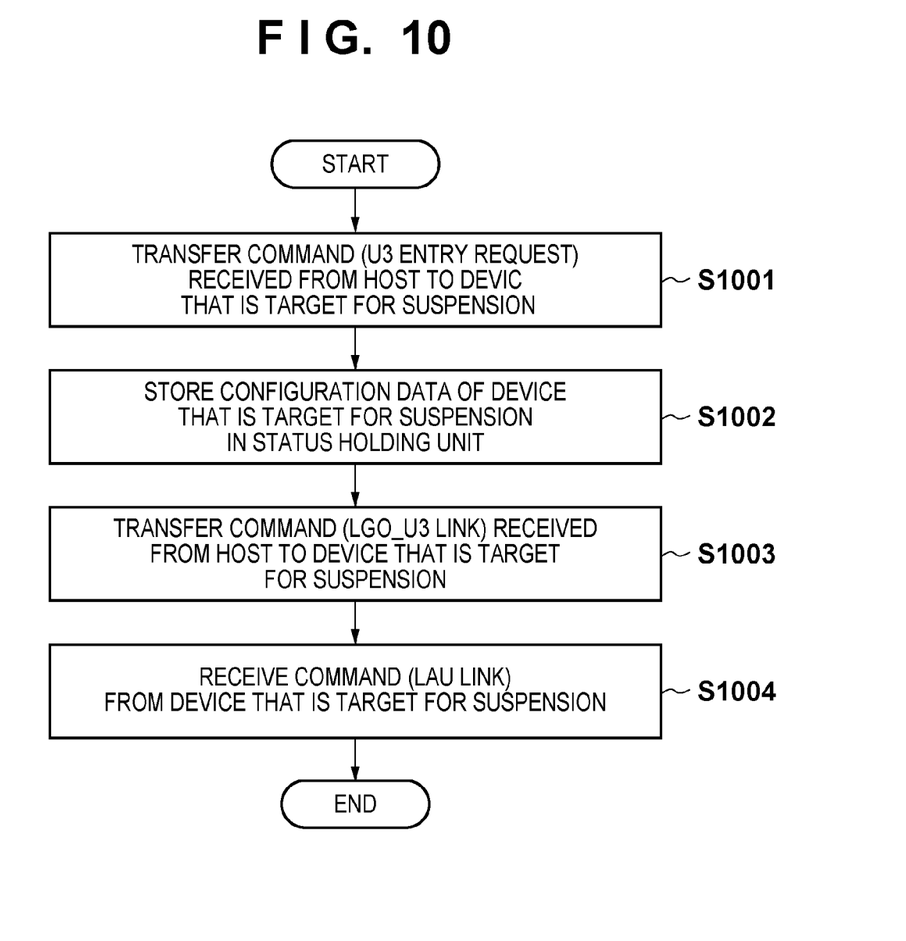
FIG. 10 is a diagram illustrating operations performed by a hub when a link is suspended according to the third embodiment.

The hub 41 transfers, to the device 26, a request to transit the device 26 to the U3 state (that is, a U3entryREQUEST) that has been sent from the host 25 (step S1001). This is a suspend instruction indicating the device 26 as the target for suspension. When the request to transit to the U3 state has been transferred to the device 26, the power control unit 6 of the hub 41 accesses the device 26, reads and obtains the configuration data of the device 26 (that is, the operation parameters and communication parameters), and stores that data in the status holding unit 8 (step S1002). Note that the configuration data of the device 26 that is the target of suspension may be stored in the status holding unit 8 at any time as long as it is before the device 26 is suspended. Next, the hub 41 transfers, to the device 26, an LGO_U3 Link command (indicating a request to transit the link from the U0 state to the U3 state) sent from the host 25 (step S1003). Then, the hub 41 transfers, to the host 25, a LAU link command (indicating acceptance of the request to transit the link state) sent from the device 26 that is the target of suspension (step S1004). After this, the link of the device 26 is transmitted to the U3 state (suspend).

Figure 11:
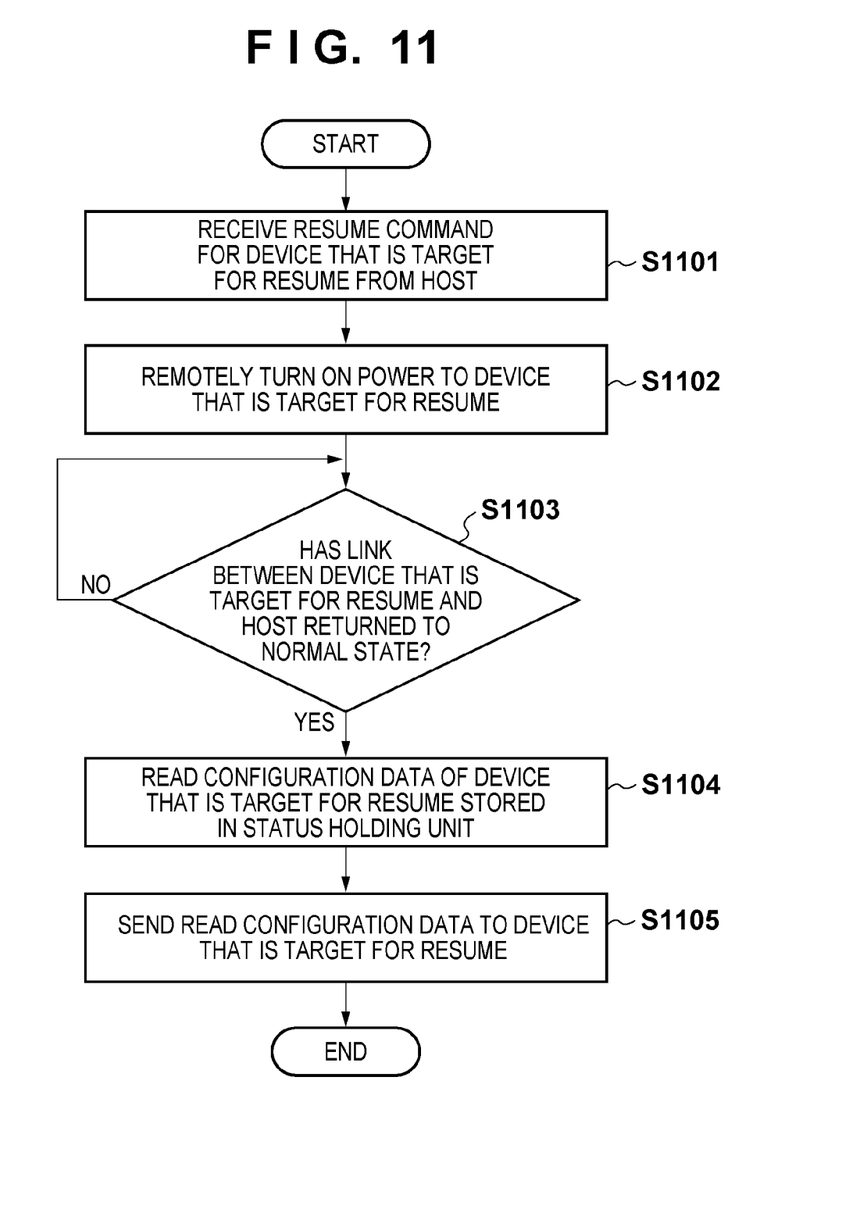
FIG. 11 is a diagram illustrating operations performed by a hub when resuming a link according to the third embodiment.

Next, operations performed by the hub 41 when transiting the device 26, which is in the suspend state and is a target for resume, from the suspend state (U3) to the normal state (U0), will be described. FIG. 11 illustrates a flow of operations in a resume process performed by the hub 41. The restoration from the U3 state to the U0 state is also controlled by system software. The resume process is carried out by setting PORT_LINK_STATE in the root port of the host 25. The processes described hereinafter are executed when the PORT_LINK_STATE is set in the root port. Upon receiving a U3 state end request (called a "resume command" hereinafter) for the device 26 that has been sent from the host 25 (step S1101), the hub 41 executes the resume process described hereinafter. This resume command is a resume instruction indicating the device 26 as the target for resume. After receiving the resume command, the hub 41 remotely turns on the power of the device 26, which is the target for resume, using a network configuration (not shown) (step S1102). After the power of the device 26 has been turned on, the link between the device 26 and the host 25 is restored to the normal state according to the states illustrated in FIG. 9. Once the link has been restored to the normal state (YES in step S1103), the power control unit 6 reads the configuration data (that is, the operation parameters and communication parameters) stored in the status holding unit 8 (step S1104), and sends that data to the device 26 (step S1105). The settings of the device 26 can be returned to the same state as before the device 26 was suspended by setting the configuration data (the operation parameters and communication parameters) in the device 26. Although the present embodiment describes the communication parameters as also being obtained from the device 26, the communication parameters may be obtained from the downstream port 29, as in the first embodiment. In addition, although descriptions regarding the setting of the communication parameters in the downstream port 29 when resuming the link have been omitted here, the setting is carried out in the same manner as in the first embodiment.

Thus far, operations performed by the hub 41 when suspending and resuming the device 26 in a data transferring system that includes a transfer configuration based on a USB 3.0 standard have been described. Although the device 26 is described in the third embodiment as the target for suspension and resume, it should be noted that the same control is carried out by the hub 41 and the same effects can be achieved even if the target is the device 27 or 28. Furthermore, although the aforementioned embodiments are described using PCIe and USB 3.0, the process for establishing connections can be simplified even in other communication standards by applying the present invention. In addition, in the aforementioned embodiments, the state transitions are carried out more smoothly if the communication parameters are saved after first saving the operation parameters when the device is transited to the suspend state and the operation parameters are set after first setting the communication parameters and restoring the link when resuming the device. Furthermore, the present invention can also be applied in a system that includes switches, hubs, or the like in multiple across a layered structure. In such a case, the present invention may be applied in the switch (hub) that is uppermost among the switches (hubs) involved in the transfer of data to the device whose configuration data is to be saved.

As described thus far, according to the aforementioned embodiments, a switch (or a hub) that connects a single host to multiple devices executes suspension processes or resume processes for the devices more on the device side than past hosts. Accordingly, it is possible to increase the speed of the suspension processes and resume processes, and it is also possible to reduce the load on the host.

According to the present invention, it is possible to increase the speed of suspension processes or resume processes for a device, and possible to reduce the load on a host.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable storage medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-256319, filed Nov. 16, 2010, which is hereby incorporated by reference herein in its entirety.

What is claimed is:

1. A data transferring apparatus that is capable of connecting a host with at least one device and that transfers a request from the host to the device, the apparatus comprising:
a control unit that, according to receiving a suspend request for suspending at least one of the devices from the host, obtains configuration data of a target device for suspension indicated by the suspend request from the device; and
a holding unit that exists between the host and the device, and holds the configuration data obtained by the control unit;
wherein the control unit exists between the host and the device, according to receiving a resume request from the host for resuming the device in the suspend state, reads the configuration data of the device held in the holding unit and sends the configuration data to the device for being resumed.

2. The apparatus according to claim 1,
wherein the holding unit further holds a conversion table for converting a request issued to the device by the host in a first address space into a second address space, and the control unit converts the first address space of the host into the second address space for the device.

3. The apparatus according to claim 1, wherein in the case where the resume request has been received, the control unit causes the host to restart the supply of a clock and power to the target device for resume, and then resumes the target device from the suspend state by setting, in the target device for resume, the configuration data of the target device for resume stored in the holding unit.

4. The apparatus according to claim 1,
wherein the data transfer is data transfer carried out in accordance with the PCI-Express standard.

5. The apparatus according to claim 1,
wherein the data transfer is data transfer carried out in accordance with the USB 3.0 standard.

6. The apparatus according to claim 1,
wherein the host is a central processing unit.

7. A data transferring apparatus that is capable of connecting a host with at least one device and that transfers a request from the host to the device, the apparatus comprising:
a control unit that, according to receiving a suspend request for suspending at least one of the devices from the host, obtains configuration data used in data communication from a port to which a target device for suspension indicated by the suspend request is connected; and
a holding unit that exists between the host and the device, and holds the configuration data obtained by the control unit;
wherein the control unit exists between the host and the device, according to receiving a resume request from the host for resuming the device in the suspend state, reads the configuration data of the device held in the holding unit and sends the configuration data to a port to which the device for being resume is connected.

8. A data transferring apparatus that is capable of connecting a host with at least one device and that transfers a request from the host to the device, the apparatus comprising:
a receiving unit that receives, from the host, a suspend request specifying one of the devices as a target device for suspension or a resume request specifying one of the devices as a target device for resume;
an obtainment unit that, in the case where the suspend request has been received by the receiving unit, obtains configuration data from the target device for suspension specified by the suspend request;
a holding unit that exists between the host and the device, and holds the configuration data obtained by the obtainment unit; and
a control unit that, in the case where the suspend request has been received by the receiving unit, transits the target device for suspension to the suspend state after the holding unit has held the configuration data, and that, in the case where the resume request has been received by the receiving unit, resumes the target device for resume from the suspend state by reading the configuration data of the target device for resume held in the holding unit and setting the configuration data in the target device for resume.

9. The apparatus according to claim 8,
wherein the receiving unit includes a register into which the suspend request and the resume request from the host are written.

10. The apparatus according to claim 8,
wherein the control unit forms a virtual bus bridge so as to be handled as a bus bridge by the host.

11. The apparatus according to claim 8,
wherein when transferring data between the host and the device, the control unit maps a bus address space of the host to a device address space, and transfers the data.

12. The apparatus according to claim 11,
wherein the bus address space is a PCI address space.

13. A control method for a data transferring apparatus that is existing between a host and at least one device and capable of connecting the host with the at least one device and that transfers the request from a host to the device, the method comprising:

obtaining, according to the reception of a suspend request for suspending at least one of the devices from the host, configuration data of the target device for suspension indicated by the suspend request from that device;

holding the configuration data obtained in the obtaining in a storage device that exists between the host and the device, and can be accessed by the data transferring apparatus; and according to receiving a resume request from the host for resuming the device in the suspend state, reading the configuration data of the device held in the storage device and sending the configuration data to the device for being resumed.

14. A control method for a data transferring apparatus that is existing between a host and at least one device and capable of connecting to the host with the at least one device and that transfers a request from the host to the device, the method comprising:

obtaining, according to the reception of a suspend request for suspending at least one of the devices from the host, configuration data used in data communication from a port to which the target device for suspension indicated by the suspend request is connected;

holding the configuration data obtained in the obtaining in a storage device that exists between the host and the device, and can be accessed by the data transferring apparatus; and according to receiving a resume request from the host for resuming the device in the suspend state, reading the configuration data of the device held in the storage device and sending the configuration data to a port to which the device for being resumed is connected.

15. A control method for a data transferring apparatus that is existing between a host and at least one device and capable of connecting the host with the at least one device and that transfers a request from the host to the device, the method comprising:

receiving, from the host, a suspend request specifying one of the devices as a target device for suspension or a resume request specifying one of the devices as a target device for resume;

obtaining, in the case where the suspend request has been received in the receiving, configuration data from the target device for suspension specified by the suspend request;

holding the configuration data in a storage device which exists between the hosts and the devices; and in the case where the suspend request has been received in the receiving, transiting the target device for suspension to the suspend state after the obtained configuration data has been held in the storage device, and, in the case where the resume request has been received in the receiving, resuming the target device for resume from the suspend state by reading the configuration data of the target device for resume stored in the holding unit and setting the configuration data in the target device for resume.

\* \* \* \* \*